March 23, 1965 R. DE VOGHEL 3,174,769
STEERING DIFFERENTIAL FOR VEHICLES
Filed Aug. 20, 1962 8 Sheets-Sheet 1
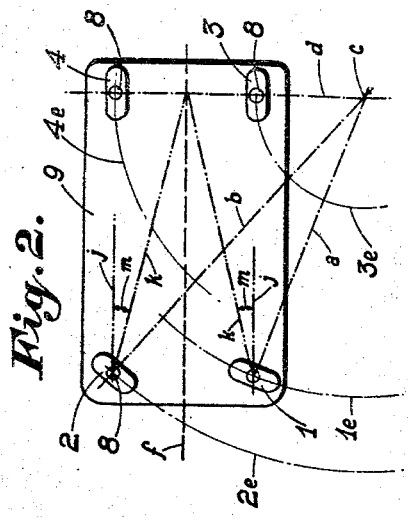
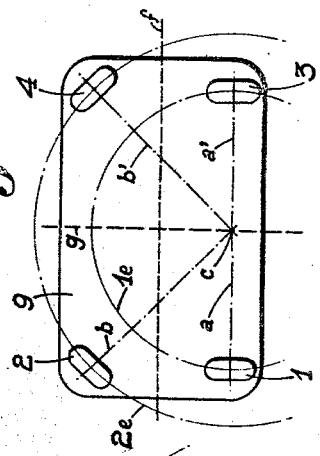
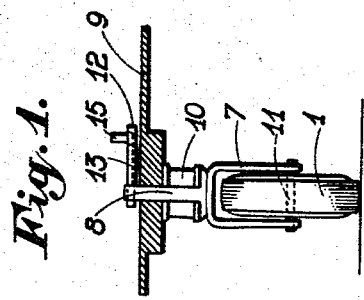
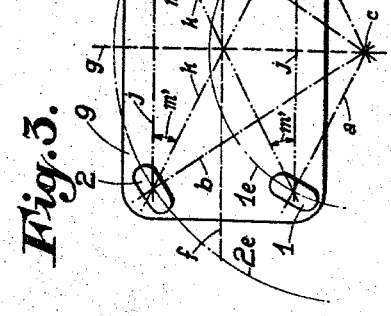

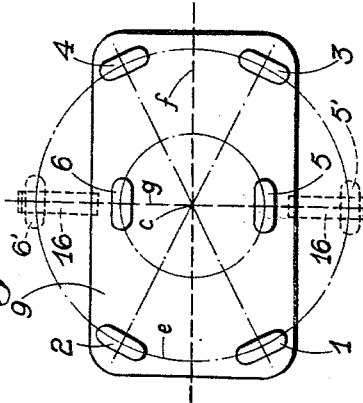
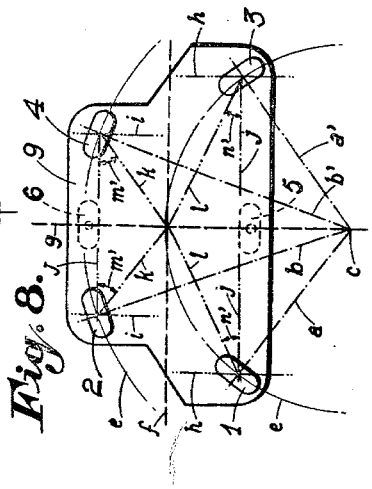
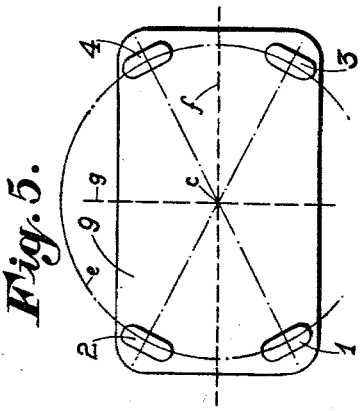
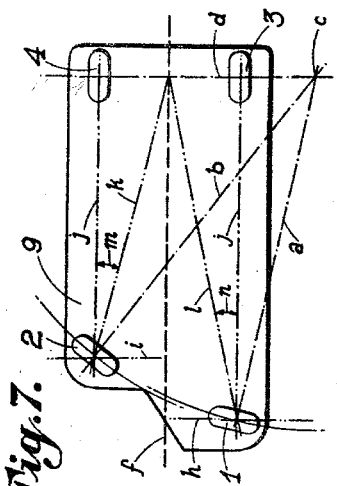

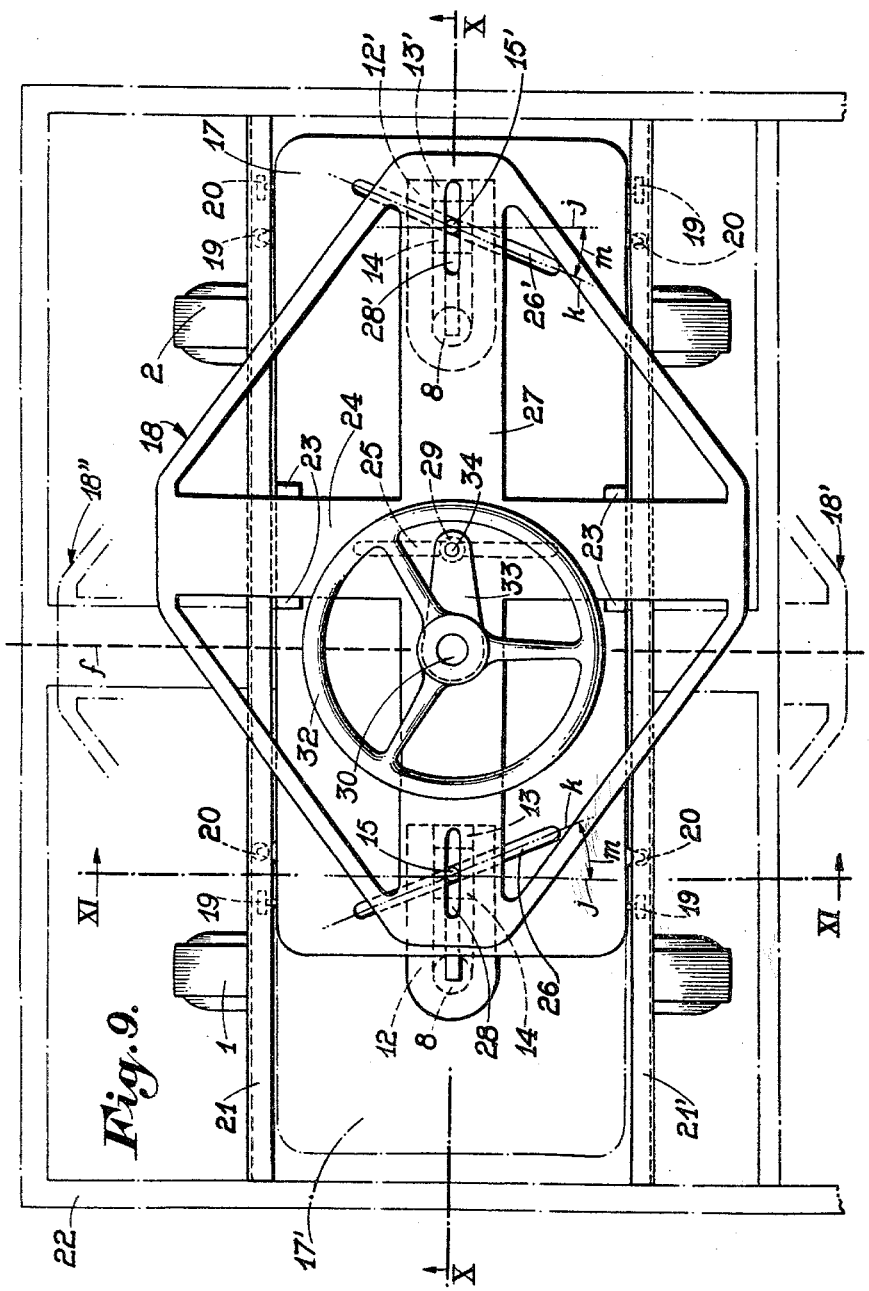

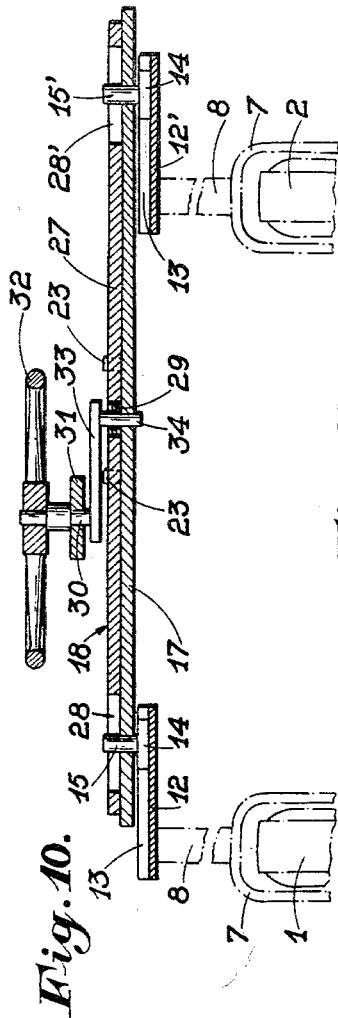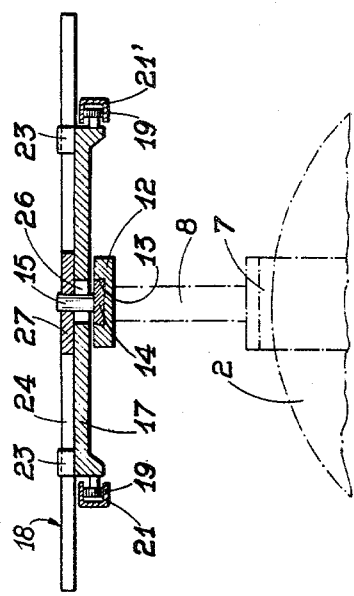

March 23, 1965   R. DE VOGHEL   3,174,769
STEERING DIFFERENTIAL FOR VEHICLES
Filed Aug. 20, 1962   8 Sheets-Sheet 7
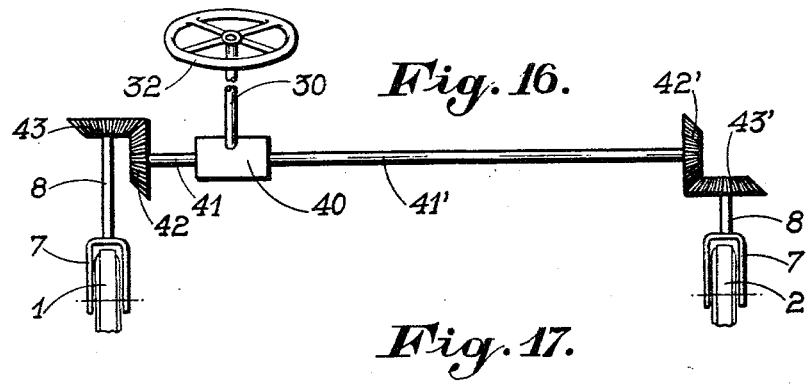
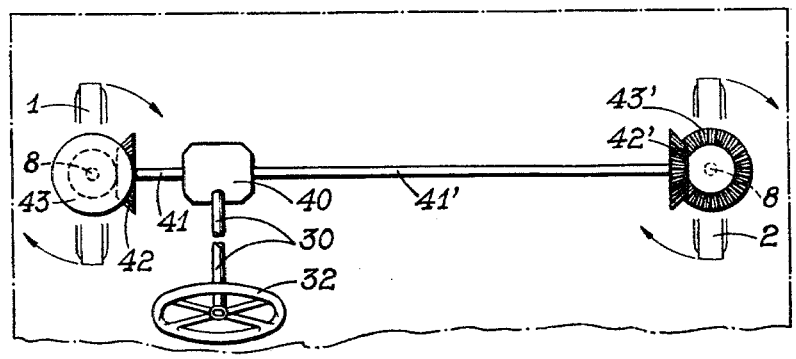
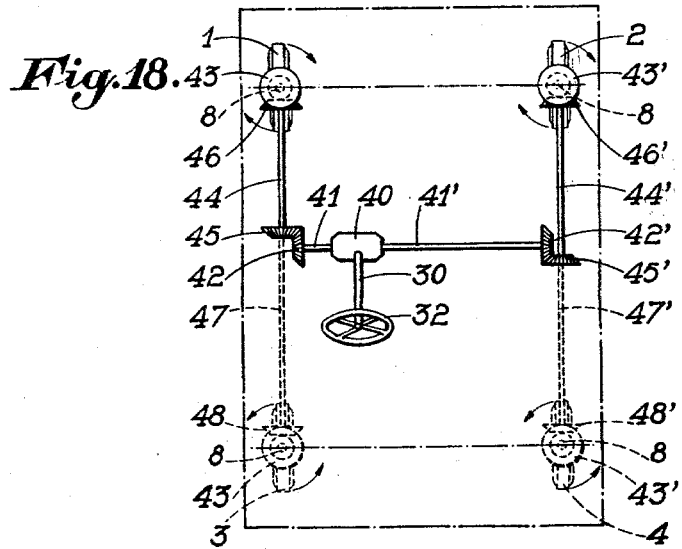

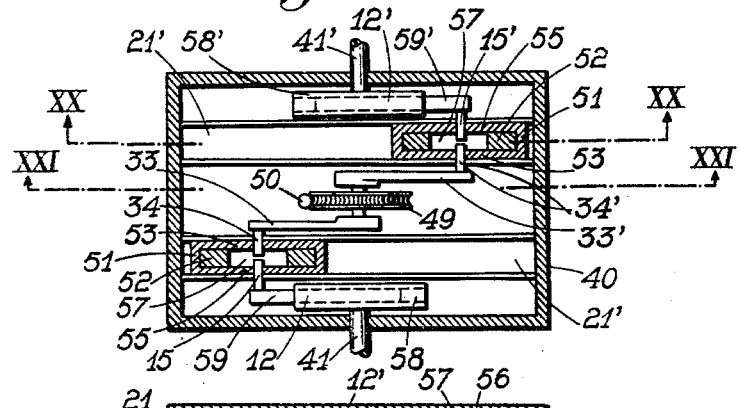
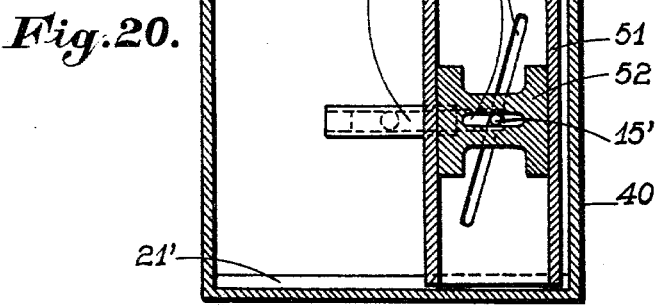
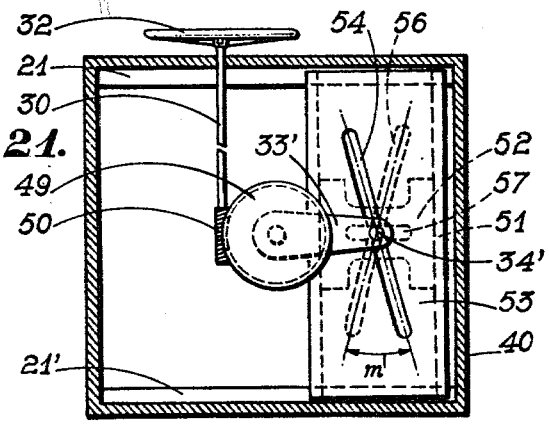

United States Patent Office 3,174,769
Patented Mar. 23, 1965

3,174,769
STEERING DIFFERENTIAL FOR VEHICLES
Raymond de Voghel, Marcinelle, Belgium, assignor to
S.A. Glaverbel, Brussels, Belgium, a Belgian company
Filed Aug. 20, 1962, Ser. No. 217,992
Claims priority, application Belgium, Sept. 11, 1961,
484,544, Patent 608,049
19 Claims. (Cl. 280—91)

The invention relates to a steering differential for towed or self-propelled vehicles.

The steering mechanisms used at present for these vehicles are generally based on the well-known principle of the deformable trapezium, resulting in a number of disadvantages owing to the fact that this affords only an approximate and limited solution to the problem of turning vehicles. The application of this principle allows only very limited angles of lock for the steerable wheels, is responsible for the slipping of tyres which causes the latter to be worn out prematurely, and is also a cause of torsional stresses affecting the chassis and the steering elements. Having to be arranged halfway up the height of the wheels, the deformable trapezium requires the wheels to be mounted on stub axles and pivots centered differently from the centre of the wheels, which has given rise to a series of imperfect corrective measures such as raking and toeing-in the wheels, resulting in retarding the advance of the vehicle and causing it to be displaced when the wheels are turned in the stopped state. A further result is the raising of the vehicle due to modifications in the inclination of the stub axle pivots, a serious disadvantage particularly for heavy vehicles, requiring excessive reduction in the steering system in order to overcome the different resistances.

The present inadequacy of the steering lock of wheels has given rise to a series of well-known compromises, the main compromise being bringing the forward and rear wheel sets close together. Here the stability and comfort of the vehicle are sacrificed for a small amount of additional mobility which is in any case inadequate. This is particularly regrettable in the case of vehicles such as long luxury coaches, lorries and autocars, there being no possibility of profitably using the length of these vehicles as would be appropriate in order to ensure comfort and stability. This comfort is then sought by increasing the weight of the vehicle, but this results in a loss of responsiveness, a need of additional power, and greater consumption of fuel and increased costs for the vehicles.

The steering differential according to the invention eliminates all these disadvantages and objections entirely. It permits of strict differentiation of the turning of the steerable wheels at any moment, so that for all the wheels of the towed or self-propelled vehicle the plane of each wheel is always perpendicular to a straight line connecting the centre of the wheel to the centre of the turning circle of the vehicle, which eliminates any scuffing of the tyres. Owing to this steering differential, the wheel need no longer be necessarily mounted on a stub axle pivot, and a vertical turning pivot can be arranged above the wheels, permitting of dispensing with the restrictions of raking and toeing-in, and also the disadvantages of braking effects, the aforesaid displacement when in the stopped state, and torsional effects on the chassis which have to be overcome at the steering wheel. It permits the steerable wheels to be turned without any limitation and for the wheels to be placed at the extreme limits of the vehicle, giving the vehicle increased useful space, stability and mobility, and also dispensing with any compromise between mobility and stability on the one hand and mobility and comfort on the other hand. Moreover, the absence of turning or steering elements between the steerable wheels, such as the steering rod for the front axle, permits of dropping to as low a height off the ground as possible.

According to the invention, the steering differential comprises mobile elements which are adapted to be displaced in different ways by a steering member and provided with straight guiding means. Some of the guiding means of one of the elements are inclined relatively to straight lines parallel to the longitudinal median axis of the vehicle to form with these straight lines constant characteristic angles. They are swept by other guiding means of a second element which intersect those of the first element, the intersection of these guiding means determining the length of oscillating arms each controlling the turning of a steerable wheel in such a manner that for a specific angle of rotation of the steering member, the oscillating arms of variable lengths impart different turning angles to the steerable wheels. The constant characteristic angle corresponds to the angle enclosed by the longitudinal axis of the vehicle and the straight line connecting the centre of the steerable wheel to the intersection of this median axis with the perpendicular to the latter within which there is situated the centre of the turning circle of the vehicle. This perpendicular coincides with the straight line connecting the centres of non-steerable wheels of a vehicle which comprises two steerable wheels adapted to be turned in an unlimited manner and two non-steerable wheels, the latter possibly being driving wheels. The centre of the turning circle of these vehicles may be situated in the vertical passing through the centre of one of the non-steerable wheels when it is a question of vehicles having non- steerable driving wheels, or on the longitudinal median axis itself, at the intersection of the straight line connecting the non-steerable wheels, when it is a question of towed vehicles, which imparts to these vehicles a greatly increased mobility relatively to those provided with a conventional steering device. When the perpendicular to the longitudinal median axis in which the turning circle centre of the vehicle is situated cuts into two equal sections the portion of the longitudinal median axis comprised between the perpendiculars to this axis passing through the centres of the end wheels at one and the same side of the longitudinal median axis, a vehicle is obtained which has four steerable wheels adapted to be turned without any limit to their turning movements. The turning radius of this vehicle may assume any value between infinity (advanced in a straight line) and zero, the latter being situated on the longitudinal median axis and permitting the vehicle to rotate on the spot about its centre. This vehicle can also comprise a pair of non-steerable wheels which can be driving wheels, and which are arranged in the perpendicular to the longitudinal median axis in which the turning circle centre is situated. These six-wheeled vehicles are also capable of rotating about their centre.

The characteristic constant angles arranged on either side of the longitudinal median axis of the vehicle are normally inversely equal to one another, in such a manner that the centres of the wheels of each wheel set are connected to one another by a perpendicular to the longitudinal median axis and that, consequently, the wheels situated on each side of this axis have the same wheel base. In some cases, however, it is advantageous for the characteristic constant angles on either side of the longitudinal median axis to be different, so that the perpendiculars to this axis passing through the centres of the wheels of at least one wheel set are offset relatively to one another and that, consequently, the wheels placed on each side of this axis are spaced at different wheel base lengths. The asymmetrical arrangement of the wheels makes it possible to arrange on the vehicles devices such as lifting gear or motors which would be difficult to install on an asymmetrical vehicle.

In the steering differential according to the invention, the straight guiding means of the mobile elements are advantageously slots in which engage crank pins of cranks whereof the length of the arms of those controlling the turning of the steerable wheels is variable when the crank of the steering member has a fixed-length arm. The mobile element provided with inclined slots, forming characteristic constant angles with straight lines parallel to the longitudinal median axis of the vehicle, has a slot parallel to the said axis and in this slot there is engaged the crank pin of the steering crank, each of the inclined slots consequently forming a characteristic constant angle with the latter slot. Moreover, the second mobile element which is provided with slots intersecting the inclined slots of the other element, has a passage through which extends the crank pin of the steering member crank.

The first element is preferably a plate which is so guided as to be capable of displacement perpendicularly to the longitudinal median axis of the of the vehicle and is provided near its edges with two inversely inclined slots and a median slot parallel to the said axis, the crank pins of the cranks having variable-length arms being engaged in the inclined slots and the crank pin of the steering member crank in the median slot.

In the first form of embodiment of the invention, the second mobile element is a plate which is arranged parallel to the first plate, guided on the latter so as to be capable of displacement in the direction of the longitudinal median axis, and provided at the ends with two slots situated perpendicularly to the said axis in such a manner as to sweep the inclined slots of the first plate, and also a central passage in the form of a perforation. The crank pins of the cranks with variable-length arms extend through the end slots and the crank pin of the steering member crank extends through the central perforation.

When the steering member is operated, for example by the steering wheel of a motor vehicle or the draw bar of a towed vehicle, the crank pin of the crank of this member simultaneously displaces the plate constituting the first mobile element in the direction perpendicular to the longitudinal median axis, and the plate forming the second mobile element in the direction of this axis, which has the result of causing the displacement relatively to one another of the superposed end slots of the two plates and of modifying in different ways, on either side of the longitudinal median axis, the points of intersection of these slots. Since the crank pins of the cranks with variable-length arms are obliged to follow these points of intersection, in the axis of which they are necessarily engaged in the slots, they modify, in moving over them, the length of the crank arms controlling the turning of the wheels. The amount by which the wheels are turned depends on the length of the crank arms and the turning angles of the steerable wheels are differentiated with respect to the angle of rotation imparted by the steering wheel or the draw bar to the crank of the steering member, in dependence on the characteristic constant angle which the inclined slots form with straight lines parallel to the longitudinal median axis of the vehicle.

In a second form of embodiment of the invention, the second mobile element comprises a pair of advantageously bell-crank levers which are pivotably mounted on pins fixed in the plate forming the first mobile element, and each provided at the two ends with slots some of which sweep the inclined slots and others the median slot of the first plate. Through the first slots of the levers extend the crank pins of the cranks having variable-length arms, and through the second, superposed slots there extends the crank pin of the steering member crank. This form of embodiment operates in a similar manner to the first. The plate forming the first mobile element is displaced, under the action of the rotational movement imparted to the steering member crank, perpendicularly to the longitudinal median axis and the crank pin of this crank passing through the superposed slots of the articulated levers on the plate, causes these levers to rotate about their pins, which displaces the outer slots of these levers which intersect the inclined slots of the plate, with the result of modifying again the points of intersection of these slots, at which there are arranged the crank pins of the cranks having variable-length arms controlling the turning of the steerable wheels.

In a third form of embodiment of the invention, the steering differential comprises a casing containing the mobile elements which are adapted to be actuated by the shaft of the steering member penetrating into the casing, and to differentiate, with respect to the angle of rotation of the said shaft, the angles of rotation of shafts issuing from the casing and controlling the turning of the steerable wheels. The shafts issuing from the casing are in this case connected by transmission members such as shafts having bevel gearwheels, to the pivots of the turning members of the steerable wheels. The mobile elements contained in the casing are advantageously subdivided into two groups each of which operates a variable-length-arm crank fixed on one of the outgoing shafts. The groups of mobile elements are arranged preferably parallel to one another on either side of a steering member comprising at each side a crank which controls the elements of a group of mobile elements so as to differentiate the movement of the outgoing shaft relatively to that of the input shaft of the device. The cranks arranged on either side of the steering member are preferably offset by 180° with respect to one another.

The elements of each group of mobile elements comprise on the one hand two small plates which are arranged parallel at a fixed distance from one another, are adapted to be displaced between guides fast with the casing, and are each provided with an oblique slot which is oblique with respect to the direction of displacement of the small plates, these slots intersecting at the characteristic constant angle. The elements of each group of mobile elements comprise on the other hand a sliding part which is arranged between the small plates, is adapted to be displaced relatively to these latter and is provided with a slot arranged perpendicularly to the direction of displacement of the said part. The crank pin of the crank of the steering member extends through one of the slots of the two small plates and engages in the slot of the sliding part, whereas the crank pin of the variable-length-arm crank extends from the other side through the second slot of the two small plates and engages, likewise from the other side, in the slot of the sliding part. The length of the crank pins of the cranks is so arranged as to permit the crank pins to pass side by side without touching one another within the sliding part.

The steering member comprises between the groups of mobile elements a gearwheel which carries at each side a fixed-length-arm crank and is driven by a worm mounted on the steering shaft entering the casing and carrying the steering wheel at its other end.

Several forms of embodiment of the invention are illustrated by way of example in the accompanying drawings.

FIGURE 1 is a diagrammatic view of a steerable wheel;

FIGURE 2 is a diagrammatic view of the turning of the steerable wheels of a vehicle provided with a steering differential according to the invention;

FIGURES 3, 4 and 5 show diagrammatically several possibilities of turning the wheels of a vehicle provided with four steerable wheels;

FIGURE 6 is a diagrammatic view of a six-wheeled vehicle, four wheels being steerable and two being adapted to be driven wheels, and FIGURES 7 and 8 show diagrammatically vehicles which have different wheel bases at the left and right sides;

FIGURE 9 is a plan view of a steering differential;

FIGURE 10 is a sectional view on the line X—X and

FIGURE 11 is a sectional view taken on the line XI—XI of FIGURE 9;

FIGURE 16 is a diagrammatic front view and

FIGURE 17 is a similar diagrammatic view but in plan of the transmission of drive by means of bevel gear-wheels for controlling the steerable wheels, from a steering differential casing;

FIGURE 18 shows a diagram similar to that of FIGURE 17 in the case of a vehicle having four steerable wheels;

FIGURE 19 is a sectional view of a steering differential casing;

FIGURE 20 is a sectional view on the line XX—XX of FIGURE 19 and

FIGURE 21 is a sectional view on the line XXI—XXI of FIGURE 19.

Figure 12:
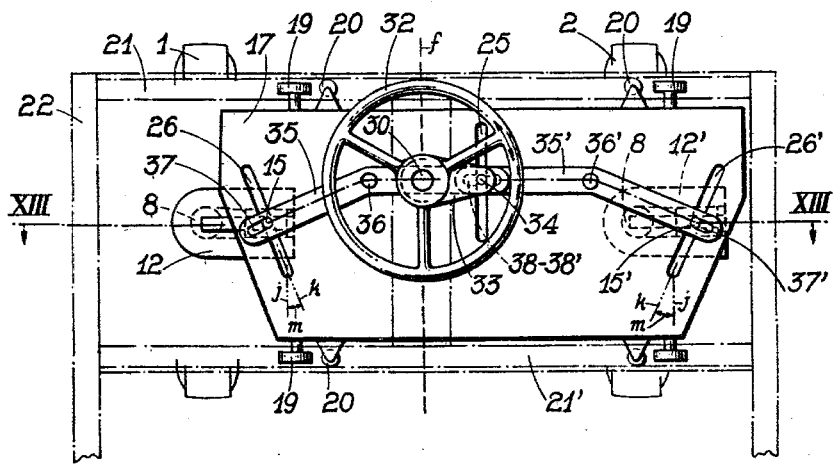
FIGURES 12, 14 and 15 are plan views of another steering differential in various positions.
Figure 13:
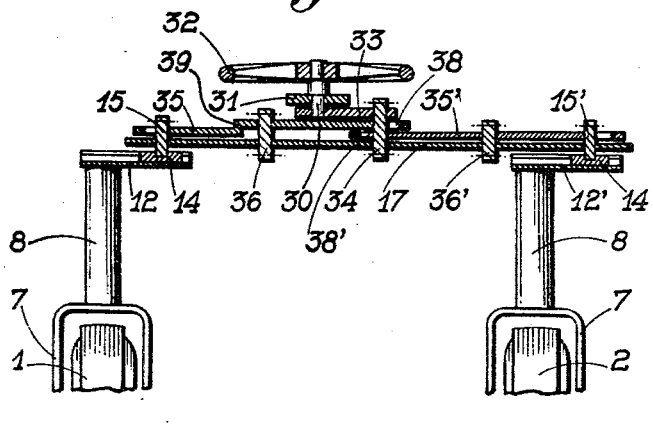
FIGURE 13 is a sectional view taken on the broken line XIII—XIII of FIGURE 12.

A vehicle provided according to the invention with a steering differential comprises steerable wheels 1 and 2 (FIGURE 2), or 1, 2, 3 and 4 (FIGURE 3) or even, but not necessarily, non-steerable wheels 5 and 6 (FIGURE 6) which can be driving wheels, which are preferably mounted in the straight fork 7 fast with a vertical pivot 8 rotating freely in the platform 9 of the vehicle or in a bearing fixed to the platform, so that the wheel can be turned through any desired angle, which can be as much as 360°. Between the fork 7 and the platform 9 there can be interposed any desired resilient suspension element 10. The fork 7 can comprise two limbs connected therein by a horizontal stub shaft 11 about which the wheel hub rotates, or a single limb in which the shaft 11 is mounted at one of its ends.

The turning of the wheel is controlled by an oscillating arm of variable length, in the present case a crank 12 fixed on the pivot 8. The crank 12 is provided with a groove 13 in which can be displaced a slide 14 (FIGURE 9) carrying a crank pin 15, in order to give the crank arm the requisite length at each instant.

By means of the crank pin 15, the crank 12 and with it the turning pivot 8 are connected to the steering differential of which several variants will be described hereinafter. In principle, the object of the steering differential is to give the crank 12 of each of the steerable wheels the necessary length so that for a specific angle of rotation of the steering member—draw bar of a towed vehicle or steering wheel of a self-propelled vehicle—the turning angle of each of the steerable wheels is differentiated and such that, in the case of all the wheels, the plane of the wheels is perpendicular to a straight line connecting the centre of the wheel to the turning centre of the vehicle.

Thus, for a four-wheeled vehicle whose wheels 1 and 2 (FIGURE 2) are steerable, the perpendiculars $a$ to the plane of the wheel 1 and $b$ to the plane of the wheel 2 meet at the turning centre $c$ situated on the perpendicular $d$ to the parallel planes of the non-steerable wheels 3 and 4. The wheels are moved on arcs of circles $1e$, $2e$, $3e$ and $4e$. Since there are no limits to the extent to which the wheels 1 and 2 can be turned, the turning centre $c$ can be chosen very close to the vehicle, which gives the vehicle extraordinary mobility as regards manoeuvring, making it possible, for example, to extract the vehicle from a line of vehicles in a single manoeuvre even if the space between the preceding vehicle and the following vehicle is only a little greater than the length of the vehicle to be extracted. If the turning centre $c$ coincided with the fixed pivot 8 of the wheel 3, the plane of the wheel 1 would be parallel to the straight line $d$, the plane of the wheel 2 perpendicular to the diagonal between the centres of the wheels 2 and 3, and the wheels 1, 2 and 4 would describe arcs of circles about the fixed pivot of the wheel 3. It would even be possible to conceive of shifting the turning centre $c$ into the fixed pivot of the wheel 4, which would make the plane of the wheel 2 parallel to the straight line $d$ and would withdraw the wheel 3 when the wheels 1 and 2 advance.

If the wheels 3 and 4 of a vehicle according to FIGURE 2 are driving wheels, it is convenient to equip it with a differential transmitting force to the wheels, and permitting one of the wheels to be locked whilst the other is driven in one or other direction, or permitting each of the wheels 3 or 4 to be driven in a different direction, which makes it possible to locate the turning centre between the pivots 8 of the wheels 3 and 4. It will be apparent that the vehicle advances in a straight line when, on the straight line $d$, the turning centre is situated "at infinity" either to the left or to the right of the longitudinal median axis $f$ of the vehicle. The steering differential according to the invention makes it readily possible to construct vehicles with four steerable wheels each of which can be turned through an unlimited angle, so that the straight lines $a$, $a'$, $b$ and $b'$, perpendicular to the planes of the wheels 1, 2, 3 and 4 (FIGURE 3), intersect one another on the straight line $g$ constituting the transverse median axis of the vehicle. In this case, the turning centre $c$ can be located on any desired point of the straight line $g$, from "infinity" to the left to "infinity" on the right of the vehicle; the wheels 2 and 4 move on the same arc of a circle $2e$ and the wheels 1 and 3 on the same arc of a circle $1e$.

FIGURE 4 shows the special case where the turning centre $c$ is situated on the intersection of the straight lines $g$ and $a$, the latter coinciding with the straight lines $a$ and $a'$ of FIGURE 3, and the planes of the wheels 1 and 3 being parallel to the straight line $g$.

Another special case is represented in FIGURE 5, here the turning centre $c$ is situated at the intersection of the longitudinal median axis $f$ and the transverse median axis $g$, the vehicle rotates about its own centre, and all the wheels move over arcs of of one and the same circle $e$. This arrangement may be advantageous for special vehicles which carry, for example, lifting gear or weapons such as guns, and which are to be capable, with the same facility, of moving in a straight line, turning through any desired arc, and rotating about their own centre.

In the case of vehicles having four steerable wheels, the question of driving the wheels presents a particular problem.

Although this problem is only of a secondary nature as far as the present invention is concerned, it will be indicated that the said problem could be solved by individual driving of some or all of the wheels, for example by means of electric motors mounted on the forks 7 and supplied by a generating set arranged on the vehicle. A more conventional solution would consist in arranging a pair of wheels 5 and 6 (FIGURE 6) in the transverse median axis $g$, to be driven by a force-transmitting differential whereby these wheels 5 and 6 can be rotated in opposite directions. In order to give the plate 9 equal stability in all directions, it may be advantageous to fix the pivot 8 of the wheels 5 and 6 on sliding beams 16 (FIGURE 6) permitting the spacing of this pair of wheels to be increahed until the said wheels, in the position 5' and 6' move over arcs of a circle $e$ on which the steerable wheels 1 to 4 are also movable. For the normal movement of the vehicle in a straight or curved line, these wheels are situated below the chassis, and in the positions 5' and 6' for manoeuvring on the spot.

The steering differential according to the invention makes it possible to envisage further adaptations of vehicles having two or four steerable wheels to particular conditions of use. For example, a case may arise where the vehicle is intended to take heavy loads of considerable length and width and of rather inconsiderable thickness, which are to be placed on edge on the platform, leaning against an oblique frame, or a case where the vehicle is intended to receive a working tool of a certain length operating only at one side of the vehicle, such as a lifting gear. In all these cases, a vehicle having a rectangular platform would be not very handy owing to its length and could not be used in workshops and stores where narrow passages with sharp bends had to be negotiated. The handiness of such vehicles is substantially increased if the wheels at one side of the vehicle are given a different wheel base from that used at the other side, for example as illustrated in FIGURES 7 and 8, in order to reduce the length of the vehicle at the side where the vehicle is not limited by the dimensions of the tool or of the load.

When the vehicle comprises two steerable wheels 1 and 2 (FIGURE 7) whose straight lines $h$ and $i$, perpendicular to the median axis $f$ from the centre of the wheels, are offset relatively to one another, the turning of the wheels by the steering device is such that the straight lines $a$ and $b$, perpendicular to the planes of the wheels 1 and 2, pass through the turning centre $c$, although the wheel base of the wheels 1 and 3 is greater than that between the wheels 2 and 4. The same is true when the wheels 1 to 4 are steerable wheels (FIGURE 8) and the straight lines $a, b, a'$ and $b'$ have their common intersection on the straight line $g$ at the turning centre $c$. In this latter case, a pair of wheels 5 and 6, preferably driving wheels, may optionally be provided, or only a supporting wheel 5 between the wheels 1 and 3.

An essential difference between the constructions wherein the wheel base is the same at both sides of the vehicle (FIGURES 2 to 6) and those where the wheel base at the right of the vehicle is different from what it is at the left of the vehicle (FIGURES 7 and 8) resides in the fact that the characteristic angle is everywhere the same in the first case, whereas it varies in the second case to the left and to the right of the vehicle. The term "characteristic angle" which will be met with in the description of each of the different forms of embodiment of the steering differential, is used to designate the angle formed by straight lines passing through the centre of the steerable wheels, whereof the straight line $j$ is parallel to the longitudinal median axis $f$ and the straight line $k$ (FIGURES 2, 7, 8) or $l$ (FIGURES 7 and 8) meets the point of intersection of the axis $f$ with the perpendicular to the latter at which the turning centre $c$ is situated. In the case illustrated in FIGURE 2, the characteristic angle $m$ is identical in the case of the wheels 1 and 2, whereas the arrangement according to FIGURE 3 (and also according to FIGURES 4 to 6) comprises four identical characteristic angles $m'$. In the vehicle according to FIGURE 7, the characteristic angle for the wheel 2 is $m$ and it corresponds to $n$ at the wheel 1. The vehicle according to FIGURE 8 comprises two identical characteristic angles $m'$ for the wheels 2 and 4, and two identical characteristic angles $n'$ for the wheels 1 and 3. It should be remarked that the characteristic angle depends on the spacing of the steerable wheels, but for the sake of greater simplicity this has not been taken into account in FIGURES 2 to 8.

It will be apparent that the steering differential according to the invention can be applied to vehicles designed otherwise than those corresponding to FIGURES 2 to 8, for example to three-wheel vehicles having two steerable wheels or wherein all three wheels are steerable.

In a first form of embodiment, the steering differential thereof is constructed to turn the wheels at one end of the vehicle, for example, the wheels 1 and 2 shown in the embodiments of FIGS. 2 and 3 of the drawings, and comprises superposed mobile plates 17 and 18 (FIGURES 9 to 11). The plate 17 is adapted to be displaced laterally along a parallel to the transverse median axis $g$ (FIGURE 3), guided by rollers 19 having a horizontal axis and 20 having a vertical axis, rotating in U-irons 21 and 21' resting on one of their flanges and fast with the chassis 22. The plate 18, perforated substantially to have a cross-like form, is adapted to be displaced on the plate 17 in the direction of the longitudinal median axis $f$, guided for this purpose by dogs 23 which are fixed in the plate 17 and embrace the limb 24 of the cross forming part of the plate 18.

The plate 17 comprises a central slot 25 parallel to the axis $f$ and two oblique slots 26 and 26' the inclination of which relatively to the straight lines $j$ parallel to the axis $f$ is such that the axes $k$ of these slots form, with the straight lines $j$, inverse characteristic angles $m$ if the wheel base of the wheels 1 and 3 (FIGURE 2) is identical to that of the wheels 2 and 4; or characteristic angles $m$ and $n$ if the wheel base of the wheels at the left of the vehicle differs from that used at the right of the vehicle (arrangement shown in FIGURES 7 and 8).

The plate 18 is provided at each end of the limbs 27 with a slot 28, 28' respectively, which are parallel to the transverse median axis $g$ (FIGURE 3) and intersect the oblique slots 26 and 26' of the plate 17. At the intersection of the limbs 24 and 27, the plate 18 has a perforation occupied by the ball bearing 29, the centre of which coincides with the axis of the slot 25 of the plate 17.

The steering member comprises a stub shaft 30 which is arranged at the intersection of the median axis $f$ and the straight line connecting the axes of the pivots 8 of the wheels 1 and 2, rotates in a vertical position in a crossmember 31 (FIGURE 10) of the chassis and comprises at its upper end either a steering wheel 32 or a draw bar (not shown in FIGURES 9 and 10) and at its lower end a crank 33 of fixed length provided with a crank pin 34 which extends through the ball bearing 29 of the plate 18 and the slot 25 of the plate 17.

The crank pins 15 and 15' of the cranks 12 and 12' mounted on the pivots 8 of the wheels 1 and 2 engage in the slots 26 of the plate 17 and 28 of the plate 18 and the slots 26' and 28' respectively, at the intersection of the superposed slots.

As already explained, the arms of the cranks 12 and 12' are of variable length, the crank pins 15 and 15' being fixed in the slides 14 which are displaceable in the grooves 13 (FIGURE 10).

When the steering wheel 32 is operated, for example in the clockwise direction, the crank pin 34 of the crank 33 moves the plates simultaneously but in different ways. The lower plate 17 is displaced transversely to the median axis $f$, by the co-operation between the crank pin 34 and the slot 25. When the crank 33 has travelled through an arc of a circle amounting to 180°, the plate 17 is situated in the position 17' and the inclined slots 26 and 26' are displaced parallel to themselves through the same distance. A second rotation of 180° of the steering wheel in the same direction or in the contrary direction returns the plate to its original position. The upper plate 18 is carried along in the movement of the plate 17 and at the same time carried out on the latter plate a displacement in the direction of the axis $f$, resulting from the co-operation between the crank pin 34 rotating in the ball bearing 29 and the dogs 23. Thus, after a quarter of a revolution of the crank in the clockwise direction, the plate 18 is situated in the position 18', and, after three-quarters of a revolution, in the opposite position 18''.

During these co-ordinated movements of the plates 17 and 18, the slots 28 and 28' of the upper plate sweep the slots 26 and 26' of the lower plate, and the crank pins 15 and 15' of the cranks 12 and 12' are obliged to move in the latter, the crank pin 15 being displaced differently from the crank pin 15'. The differentiated length of the cranks 12 and 12' which results has the consequence that the pivots 8 of the wheels 1 and 2 carry out rotational movements of different angular amounts at the wheel 1 end at the wheel 2. The turning of these wheels is differentiated in such a manner that the perpendiculars to the planes of the wheels passing through the centre of the said wheels intersect at the turning centre of the vehicle, owing to the inclination of the slots 26 and 26' which corresponds constantly to the characteristic angle.

In a further form of embodiment (FIGURES 12 to 15)

which is also constructed as in the embodiment of FIGS. 9–11 to turn the wheels at one end only of the vehicle, the steering differential differs from that according to FIGURES 9 to 11 in that the plate 18 is replaced by a pair of two-arm levers 35 and 35' which are pivotably mounted on pins 36 and 36' fixed in the plate 17 and are provided at their ends with slots 37, 37', 38 and 38'.

The lever 35 is doubly bent at 39 (FIGURE 13) so that the slots 38 and 38' are superposed on one another and can be occupied by the crank pin 34 of the crank 33 controlled by the steering wheel 32. As previously, the axes $k$ of the inclined slots 26 and 26' form with the straight line $j$ parallel to the longitudinal median axis $f$, inverse characteristic angles $m$ (FIGURE 12) or angles $m$ and $n$ if the wheel bases at the right and left sides of the vehicle are not identical to one another. The levers 35 and 35' are advantageously elbowed at the place where the pins 36 and 36' are situated, in order that the inclined slots 26 and 26' are swept by the slots 37 and 37' at an angle facilitating the sliding of the crank pins 15 and 15' which are engaged in these slots. When the wheels 1 and 2 are parallel to the median axis $f$ and the vehicle advances in a straight line (FIGURE 12), the angle between the outer slots substantially approaches a right angle and even when the wheels are considerably deflected (FIGURES 14 and 15), this angle still remains favourable to the easy movement of the crank pins.

Figure 14:
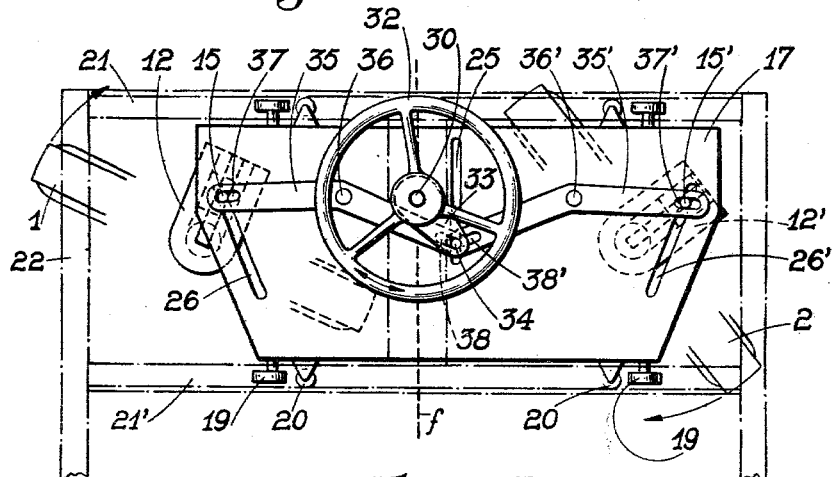
Figure 15:
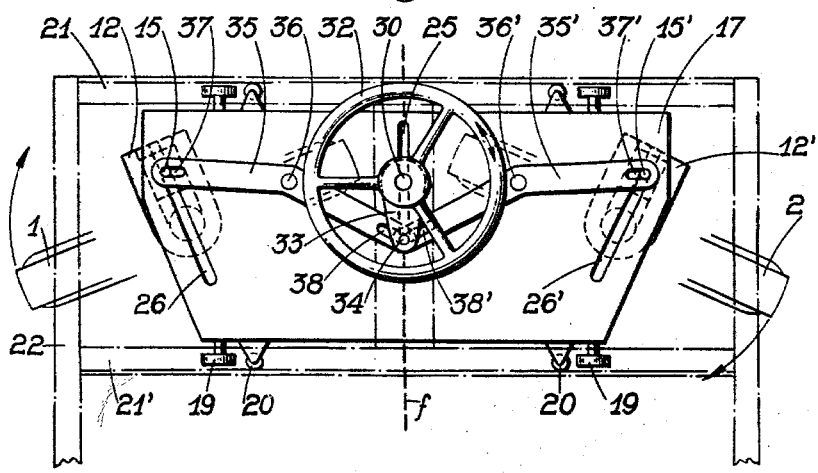

FIGURES 12, 14 and 15 show the position of the plate 17, the position of the levers 35 and 35', cranks 12 and 12', and wheels 1 and 2, and also the useful length of the cranks 12 and 12' for three different positions of the crank 33 obtained by manipulating the steering wheel 32.

In the arrangement shown in FIGURE 12, wherein the crank 33 is parallel to the cranks 12 and 12' which are all in the same perpendicular direction to the longitudinal median axis $f$, the useful length of the cranks 12 and 12' is identical, the crank pins 15 and 15' are situated approximately in the middle of the slots 26 and 26', the inner arms of the levers 35 and 35' are aligned, and the plate 17 is displaced completely towards the right.

An angular displacement of the crank 33 through approximately 45° (FIGURE 14) displaces the plate 17 towards the left, breaks the alignment of the internal arms of the levers 35 and 35', displaces the crank pins 15 and 15' in the direction of the end of the slots 26 and 26', reduces the useful length of the crank 12 and increases that of the crank 12', in such a manner as to subject these cranks to different angular displacement which turn the wheels so as to make the vehicle carry out a turning movement the centre of which is outside the area occupied by the vehicle, for example as indicated by the turning centers of the wheels 1 and 2 shown in the embodiments illustrated in FIGURE 2 or 3.

If the angular displacement of the crank 33 reaches a position forming a right angle (FIGURE 15) relatively to the position shown in FIGURE 12 the plate is displaced still further towards the left, the crank pin 34 is situated at the outer ends of the slots 38 and 38', which intersect, when it was in the middle of these slots, in the arrangement shown in FIGURE 12; the crank pins 15 and 15' occupying the end of the slots 26 and 26' and the axes of the cranks 12 and 12' coinciding with the axes of these slots, it will be seen that a special position is presented wherein the wheels are in planes perpendicular to the slots, which are inclined and orientated so as to cause the vehicle to turn about its centre, as shown in FIGURES 5 and 6.

It will be apparent that the arrangement according to FIGURE 9 also makes it possible to carry out all the turning movements of the steerable wheels described for the steering differential according to FIGURES 12 to 15.

In a third form of embodiment, the steering differential is more compact than in the forms of embodiment described previously, and can be enclosed in a casing of small dimensions which can be arranged at any suitable point on the vehicle. In principle, a specific angular movement of the shaft 30 of the driving member, entering the casing 40 (FIGURES 16 to 18), is differentiated within the latter and transferred to the output shafts 41 and 41' which transmit the differentiated angular movements to the pivots 8 of the forks 7 of each of the wheels 1 and 2 by means of bevel gearwheels 42 and 43, 42' and 43' respectively. In the embodiment shown in FIGURES 16 and 17, which is constructed to turn the wheels at one end only of the vehicle, the casing 40 is also intersected by the plane passing through the axes of the pivot 8 and the output shafts 41 and 41', but it may be arranged in any desired position on the general layout of these shafts. However, it is easy to situate the casing outside this plane by interposing between the bevel gearwheels 42, 43 and 42', 43' respectively, shafts 44 and 44' which are provided at their ends with bevel gearwheels 45, 46 and 45', 46' respectively (FIGURE 18, portion of the diagram shown in full lines). As is shown in FIG. 18 also, it is easy to extend this transmission of differentiated angular movements to vehicle having four steerable wheels. For this purpose, the shafts 44 and 44' are prolonged by shafts 47 and 47' carrying terminally a bevel gearwheel 48 or 48' meshing with the bevel gearwheel 43 or 43' mounted on the pivots 8 of the wheels 3 and 4 (FIGURE 18, portion of the diagram shown in broken lines). It will be apparent that the bevel gearwheels 45 and 45' can be fixed at any desired point in the general layout of the shafts 44 and 47.

The disclosed steering differential enclosed in the casing 40 is based on that shown in FIGURES 9 to 11 but may be composed of the structural features of the embodiments disclosed in FIGS. 9–11 and 12–15 to turn either two or four wheels as indicated in FIGS. 16 to 18. As shown, the steering differential in casing 40 comprises on either side of a gearwheel 49 (FIGURE 19) driven by a worm 50 fixed on the input shaft 30 actuated by the steering wheel 32, a fixed-length crank 33 or 33', whose crank pin 34 or 34' controls a device having co-ordinated plates which regulates the useful length of a crank 12 or 12', communicating to the output shafts 41 or 41' an angular movement differentiated with respect to the angular movement imposed on the input shaft 30.

Whereas the steering differential according to FIGURES 9 to 11 comprises a single device with co-ordinated plates 17 and 18, extending substantially over the entire width of the vehicle and regulating the differentiated turning of two steerable wheels, the differential according to FIGURES 19 to 21 comprises two devices with co-ordinated plates, as has just been discussed. These latter are of greatly reduced dimensions and are arranged parallel to one another within the casing 40, and each one regulates the turning of a single steerable wheel, if appropriate the steerable wheels at one side of a vehicle having four steerable wheels controlled by a transmission unit comprising bevel gearwheels is accordance with the diagram shown in FIGURE 18.

The device using co-ordinated plates contained in the casing 40 are each constituted of a hollow body 51 of rectangular cross-section (FIGURE 19) which is adapted to be displaced between the guides 21 and 21' from one wall of the casing to the other, and of a slide 52 adapted to be displaced within the hollow body 51, perpendicularly to the direction of displacement of the latter (FIGURES 19 to 21). The face 53 of the body 51 is provided with a slot 54 (FIGURE 21) which is inclined relatively to the guides 21 and 21', and the opposite face 55 with a slot 56 (FIGURE 20) which is inclined relatively to the slot 54 in such a manner that these slots form between themselves the characteristic angle $m$ (FIGURE 21). (If the steering differential casing is intended for a vehicle whose left-side wheels have a different wheel base from that used for the right-hand side wheels, the angle between the slots of the body 21 situated at one side of the gearwheel 49 will be $m$, and the angle between the slots of the body 51 which is situated at the other side of this gearwheel will be n, for the reasons given earlier).

The slide 52 comprises a slot 57 which is parallel to the guides 21 and 21'. The crank pins 34 and 34' of the cranks 33 and 33' each extend through a slot 54 and penetrate into a slot 57. The crank pins 15 and 15' of the cranks whose useful length can be modified each extend through a slot 56 and also penetrate into a slot 57. The length of the crank pins and the thickness of the slide 52 are, of course, so arranged that the crank pins 15 and 34 and 15' and 34' can within the slot 57 pass beside one another without touching each other at their ends, and thus without hindering each other in their respective movements.

In the arrangement shown in FIGURE 19, the cranks 33 and 33' occupy positions arranged at 180° opposite to one another, which has the advantage of balancing the moving masses in the casing, the bodies 51 and, within the latter, the slides 52 which are displaced in opposite directions, but the effect of these displacements on the output shafts 41 and 41' would be the same if the cranks 33 and 33' were orientated in the same direction and if the devices with co-ordinated plates were therefore displaced in the same direction. It will also have been noted that FIGURE 19 shows cranks whose useful length can be modified and which are constituted by a tube 58 or 58' in which can slide a rod 59 or 59' carrying the crank pin 15 or 15'. Finally, the input shaft 30 can of course be arranged at any desired inclination relatively to the casing 40.

The inter-associated movements of the hollow bodies 51 and slides 52 produced by a specific angular displacement of the cranks 33 and 33', differentiate the angular movements of the output shafts 41 and 41', modifying the useful length of the cranks 12 and 12', and have indirectly on the pivots 8 of the steerable wheels an effect similar to that produced by the single crank 33 of the form of embodiment shown in FIGURES 7 to 9 on the co-ordinated plates 17 and 18 which act directly on the cranks 12 and 12' of variable useful length and, through the latter, on the pivots 8.

The invention is not, of course, limited to the forms of embodiment which have been described and illustrated by way of example, and modifications could be made thereto without departing from the scope of the said invention.

I claim:

1. Steering mechanism for a vehicle having at least one pair of steerable wheels, comprising a steering member connected to each steerable wheel to turn the latter about a vertical axis passing through the center of such wheel, a crank arm of variable length connected to said member for turning the latter about its longitudinal axis and having a pin displaceable longitudinally thereof to vary the length of such crank arm, a steering device for the vehicle, and means connecting said steering device to said crank arm pins and operable to control the displacements of said pins and through such displaced pins to turn said crank arms to turn said steerable wheels so that the plane of each wheel will always be perpendicular to a straight line connecting the center of the wheel to the center of any turn which the vehicle is caused to make by said steering device, said connecting means including a first rectilinear guide member for each crank arm pin disposed at a given angle to the longitudinal median axis of the vehicle and reciprocatable on movements of said steering device along a rectilinear path perpendicular to said median axis and parallel to a line connecting the vertical turning axes of said wheels, and including a second rectilinear guide member for each crank arm pin disposed in intersecting relation to said first guide member and displaceable in a circular path on movements of said steering device to displace the crank arm pin along the length of said first guide member and thereby to vary the length of the crank arm provided with such pin so as to maintain said perpendicular relation of each steerable wheel to the turning center of the vehicle as such wheel is being turned by said steering device.

2. Steering mechanism for a vehicle having at least one pair of steerable wheels, comprising a steering member connected to each steerable wheel to turn the latter about a vertical axis passing through the center of such wheel, a steering device for the vehicle, and means connecting said steering device to said steering members and operable to turn said steerable wheels so that the plane of each wheel will always be perpendicular to a straight line connecting the center of the wheel to the center of any turn which the vehicle is caused to make by said steering device, said connecting means including a crank arm of variable length connected to each wheel steering member for turning the latter about its longitudinal axis and having a pin displaceable longitudinally thereof to vary the length of said crank arm, a first elongated guide member for each crank arm pin reciprocatable on movements of said steering device along a rectilinear path perpendicular to such pin and parallel to the crank arm on which said pin is provided, and a second elongated guide member for each crank arm pin disposed in intersecting relation to said first guide member and displaceable on movements of said steering device in a circular path perpendicular to such pin and parallel to the crank arm on which said pin is provided, one of said first and second guide members associated with each crank arm pin being straight and disposed at a given angle to the median axis of the vehicle extending between said wheel steering members, and the other of said guide members sweeping across said one guide member during movements of said steering device to displace the crank arm pin along the length of said one guide member and thereby to vary the length of the crank arm provided with such pin so as to preserve said perpendicular relation of each steerable wheel to the turning center of the vehicle as such wheel is being turned by said steering device.

3. Steering mechanism such as defined in claim 2, in which the vehicle is provided with two wheels on each side of said median axis of the vehicle, the two wheels situated on one side of said axis having the same wheel base as the two wheels situated on the other side of said axis, and in which all of said straight guide members associated with the steerable wheels of said vehicle are disposed at the same given angle to such median axis.

4. Steering mechanism such as defined in claim 2, in which the vehicle is provided with two wheels on each side of said median axis of the vehicle, the two wheels situated on one side of said axis having a different wheel base than the two wheels situated on the other side of said axis, and in which the straight guide members associated with steerable wheels on said one side of such median axis are disposed at a different given angle to such median axis than the guide members associated with steerable wheels on the other side of such median axis.

5. Steering mechanism such as defined in claim 2, in which each of said guide members is constituted of a plate like part having an elongated slot through which extends as associated crank arm pin, each of said straight guide members having a straight slot disposed at said given angle.

6. Steering mechanism such as defined in claim 2, in which each of said crank arms is directly connected to one of said steering members.

7. Steering mechanism such as defined in claim 2, in which said crank arms are spaced from said steering members, and motion transmitting means connecting each of said crank arms to one of said steering members.

8. Steering mechanism such as defined in claim 2, in which said steering device comprises a movable steering element, a crank arm of fixed length connected to said element and to an associated pair of said first and second guide members and operable on movement of said steering element to simultaneously impart reciprocating movement to said first guide member and circular movement to said second guide member.

9. Steering mechanism such as defined in claim 8, including a rigid member connected to that one of said guide members which is straight and disposed at a given angle to said median axis of the vehicle, said rigid member having a slot parallel to said median axis, and said crank arm of fixed length having a pin engaged in said parallel slot and through said pin and slot and said rigid member imparting reciprocating movement to said straight guide member.

10. Steering mechanism such as defined in claim 9, including a rigid member connected to the other of said associated guide members and having an opening through which the pin of said crank arm of fixed length extends and imparts circular motion to said other guide member on movement of said steering element.

11. Steering mechanism such as defined in claim 2, including a plate extending between the longitudinal axes of said wheel steering members and means slidably supporting said plate for reciprocating movement parallelly to a line joining said longitudinal axes and perpendicularly to said median axis of the vehicle, said plate carrying on its ends said straight guide members disposed at a given angle to said median axis, and being provided intermediate said guide members with an elongated slot parallel to said median axis, and in which said steering device comprises a movable steering element and a crank arm controlled by said steering element and having a pin engageable in said elongated slot so that movement of said steering element imparts reciprocatory movement to said plate and said straight guide members.

12. Steering mechanism such as defined in claim 11, including rigid means arranged parallel to said plate and provided at its ends with the other of said guide members arranged in intersecting relation with said straight guide members, said crank arm pin being connected to said rigid means to impart circular movement to said other guide members as said plate is reciprocated.

13. Steering mechanism such as defined in claim 2, including a casing containing said connecting means, and a pair of output shafts extending from said casing and each drivingly connected to the steering member of a steerable wheel, and in which said steering device comprises a steering element operable to turn the vehicle, a steering shaft carrying said steering element and extending into said casing, and means in said casing connected to said steering shaft and operable on movement of said steering element to impart corresponding reciprocating movement to said first guide members and circular movement to said second guide members of said connecting means, and in which said variable length crank arms of said connecting means are connected to said pair of output shafts.

14. Steering mechanism such as defined in claim 13, including rotational transmission elements connecting the output end of each of said output shafts to the steering member of at least one steerable wheel.

15. Steering mechanism such as defined in claim 13, in which each associated variable length crank arm, first guide member and second guide member are formed into a unitary group arranged parallel to the other unitary group thereof and said unitary groups are arranged on opposite sides of said operable means for connecting said steering shaft thereto.

16. Steering mechanism such as defined in claim 15, in which said operable means for connecting said steering shaft to said unitary groups comprises a pair of crank arms, each connected to one of said unitary groups and being offset relative to the other by 180°.

17. Steering mechanism such as defined in claim 16, in which the associated first and second guide members in each group comprise a pair of spaced parallelly arranged plates secured to one another and slidably mounted for reciprocatable movement in said casing, each of said plates being provided with a slot disposed obliquely to the direction of slidable movement of said plates and opposite to each other so that they intersect at a given angle, and a member slidably mounted between said plates and provided with a slot intersecting said oblique plate slots, and in which the pin of the associated crank of said steering device extends through the oblique slot of one of said plates and into one side of the slot of said sliding member, and the pin of the associated crank arm of variable length extends through the oblique slot of the other of said plates and into the other side of the slot of said sliding member, the lengths of the crank pins being such that the portions thereof extending into the opposite sides of the slot of said sliding member may move past each other without interference.

18. Steering mechanism such as defined in claim 16, in which said crank arms of said operable means of said steering device are of fixed length, and in which such operable means comprises a worm gear secured to both of said fixed length crank arms, and a worm mounted said steering shaft and drivingly engaging said worm gear.

19. Steering mechanism for a vehicle having at least one pair of steerable wheels, comprising a steering member connected to each steerable wheel to turn the latter about a vertical axis passing through the center of such wheel, a steering device for the vehicle, and means connecting said steering device to said steering members and operable to turn said steerable wheels so that the plane of each wheel will always be perpendicular to a straight line connecting the center of the wheel to the center of any turn which the vehicle is caused to make by said steering device, said connecting means including a crank arm of variable length connected to each wheel steering member for turning the latter about its longitudinal axis and having a pin displaceable longitudinally thereof to vary the length of said crank arm, first means having spaced parts each provided with an elongated slot through which one of said crank arm pins extends and each being connected to and operable by said steering device to reciprocate along a straight path perpendicular to such pin and parallel to the crank arm on which said pin is provided, and second means having spaced parts each adjacent to one of said spaced parts of said first means and provided with an elongated slot through which one of said crank arm pins extends and disposed in intersecting relation to the guide slot in said one spaced part of said first means so that the same pin extends through both of such slots, said second means being connected to and operable by said steering device to move each of said spaced parts thereof along a circular path perpendicular to its associated pin and parallel to the crank arm on which said pin is provided, the slot in one of the spaced parts of said first and second means associated with each extending pin being straight and disposed at a given angle to the median axis of the vehicle extending between said wheel steering members, and the slot in the other of said spaced parts associated with such extending pin sweeping across such straight slot in said one part during movements of said steering device to displace such extending pin along the straight slot in said one part and thereby to vary the length of the crank arm provided with such extending pin so as to maintain said perpendicular relation of each steerable wheel to the turning center of the vehicle as such wheel is being turned by said steering device.

References Cited in the file of this patent
UNITED STATES PATENTS

| 1,126,111 | Smith | Jan. 26, 1915 |
| 2,715,534 | Hoge et al. | Aug. 16, 1955 |
| 2,756,066 | Ludowici | July 24, 1956 |
| 2,901,265 | Knight et al. | Aug. 25, 1959 |